US008359636B2

(12) United States Patent
Rajagopal et al.

(10) Patent No.: US 8,359,636 B2
(45) Date of Patent: Jan. 22, 2013

(54) METHOD AND SYSTEM FOR MODELING OPTIONS FOR OPAQUE MANAGEMENT DATA FOR A USER AND/OR AN OWNER

(75) Inventors: Murali Rajagopal, Irvine, CA (US); Hemal Shah, Trabuco Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 920 days.

(21) Appl. No.: 12/118,179

(22) Filed: May 9, 2008

(65) Prior Publication Data

US 2008/0282328 A1    Nov. 13, 2008

Related U.S. Application Data

(60) Provisional application No. 60/917,199, filed on May 10, 2007.

(51) Int. Cl.
*H04L 29/06*    (2006.01)
(52) U.S. Cl. .................................. 726/4; 726/21; 726/28
(58) Field of Classification Search .................. None
See application file for complete search history.

(56) References Cited

U.S. PATENT DOCUMENTS

| 6,539,425 B1* | 3/2003 | Stevens et al. ................ 709/220 |
| 6,922,695 B2 | 7/2005 | Skufca et al. |
| 2002/0123966 A1* | 9/2002 | Chu et al. ........................ 705/43 |
| 2003/0055694 A1 | 3/2003 | Menninger |
| 2003/0126464 A1* | 7/2003 | McDaniel et al. ............ 713/201 |
| 2004/0128375 A1* | 7/2004 | Rockwell ....................... 709/223 |
| 2005/0004974 A1* | 1/2005 | Sharma et al. ................ 709/202 |
| 2005/0071363 A1* | 3/2005 | Chen et al. .................... 707/102 |
| 2006/0168216 A1 | 7/2006 | Wolf-Reber |
| 2007/0016597 A1 | 1/2007 | Beadles et al. |
| 2008/0178267 A1* | 7/2008 | Rajagopal et al. ................ 726/4 |
| 2010/0071074 A1* | 3/2010 | Choi et al. ....................... 726/30 |

OTHER PUBLICATIONS

R. Meersman, Z. Tari et al. (Eds.) Distributed PRovision and Management of Security Services in Globus Toolkit 4. OTM 2006, LNCS 4276, pp. 1325-1335, 2006. © Springer-Verlag Berlin Heidelberg 2006.*
Papanyan, Khachatur, et al. (Eds.) Roles Based Authorization Profile. DMTF. Document Number: DSP1039, Version: 1.0.0a. Oct. 23, 2006.*
Unkown Authors. CIM Policy Model White Paper. DMTF. Document Number: DSP108, Version 2.7. Jun. 18, 2003.*
R. Meersman et al. (Eds.): On the Application of the Semantic Web Rule Language in the Definition of Policies. OTM Workshops 2005, LNCS 3762, pp. 69-78, 2005. © Springer-Verlag Berlin Heidelberg 2005.*

(Continued)

*Primary Examiner* — Nathan Flynn
*Assistant Examiner* — Michael R Vaughan
(74) *Attorney, Agent, or Firm* — Thomas|Horstemeyer, LLP

(57) ABSTRACT

Distributed Management Task Force (DMTF) management profiles, based on the Common Information Model (CIM) protocol, may be utilized to perform access authentication during opaque management data profile operations based on DMTF/CIM Role Based Authorization (RBA) profile and/or Simple Identity Management (SIM) profiles. Instances of CIM_Identity class may be utilized to enable validation of ownership and/or access rights, via instances of CIM_Role class and/or instances of CIM_Privilege class for a plurality of common users and/or applications. Quota related operations may be performed via "QuotaAffectsElement" associations between instances of CIM_Identity class and instances of the CIM_OpaqueManagementDataService class. The "QuotaAffectsElement" association may comprise "AllocationQuota" and/or "AllocatedBytes" properties to enable tracking and/or validating of quota related information within the opaque management data profile.

33 Claims, 5 Drawing Sheets

OTHER PUBLICATIONS

International Search Report and Written Opinion corresponding to International Application Serial No. PCT/US2008/063285 mailed Oct. 30, 2008, 10 pages.

International Preliminary Report on Patentability for International Patent Application No. PCT/US2008/063285, mailed Nov. 19, 2009.

Nabhen R., et al., "RBPIM: A PCIM-Based Frame for RBAC", Proceedings, of the 28th Annual IEEE International Conference on Local Computer Networks (LCN'03), Oct. 20, 2003, XP010665950.

"Role Based Authorization Profile", DSP1039, version 1.0.0a, Oct. 13, 2006, SP002678525.

"CIM user and Security Model White Paper", DMTF, DSP0139, version 2.7.2, Jun. 2003, XP002678507.

European Search Report in co-pending, related European Application No. 08755255.0, mailed Jul. 11, 2012.

* cited by examiner

METHOD AND SYSTEM FOR MODELING OPTIONS FOR OPAQUE MANAGEMENT DATA FOR A USER AND/OR AN OWNER

CROSS-REFERENCE TO RELATED APPLICATIONS/INCORPORATION BY REFERENCE

This patent application makes reference to, claims priority to and claims benefit from U.S. Provisional Application Ser. No. 60/917,199 filed on May 10, 2007.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to network management. More specifically, certain embodiments of the invention relate to a method and system for modeling options for opaque management data for a user and/or an owner.

BACKGROUND OF THE INVENTION

Information Technology (IT) management may require performing remote management operations of remote systems to perform inventory and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to validate that systems may be up-to-date, and/or to perform any security patch updates that may be necessary.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for modeling options for opaque management data for a user and/or an owner, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for modeling options for opaque management data for a user and/or an owner. In various exemplary embodiments of the invention, opaque management data operations may be performed in a managed system. The managed system may be managed via Distributed Management Task Force (DMTF) management profiles, based on the Common Information Model (CIM) protocol. Access authentication operations may be performed during opaque management data operations based on DMTF/CIM Role Based Authorization (RBA) and/or Simple Identity Management (SIM) profiles. One or more instances of the CIM_Identity class may be utilized to enable validation of ownership and/or access rights, via instances of the CIM_Role class and/or instances of the CIM_Privilege class. Consequently, a plurality of common users, which may be represented via instances of CIM_Account class, and/or a plurality of common applications, which may be represented via instances of CIM_UserEntity class; may be authenticated via the instances of the CIM_Identity class. Quota related operations may be performed via "QuotaAffectsElement" associations between instances of CIM_Identity class and instances of the CIM_OpaqueManagementDataService class. The "QuotaAffectsElement" association may comprise "AllocationQuota" and/or "AllocatedBytes" properties to enable tracking and/or validating quota related information within the opaque management data profile.

Figure 1:
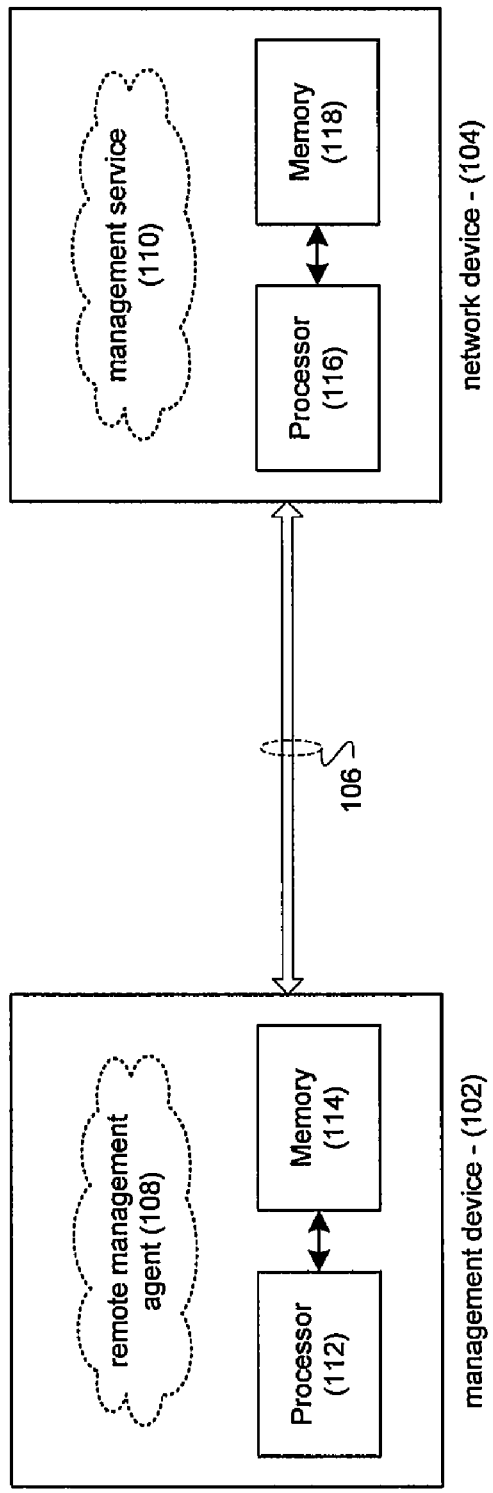
FIG. 1 is a block diagram that illustrates exemplary communication setup between a management device and a network device, which may be utilized in accordance with an embodiment of the invention.

FIG. 1 is a block diagram that illustrates exemplary communication setup between a management device and a network device, which may be utilized in accordance with an embodiment of the invention.

Referring to FIG. 1, there is shown a management device 102, a network device 104, a management connection 106, a remote management agent 108, a management service 110, a processor 112, a memory 114, a processor 116, and a memory 118.

The management device 102 may comprise suitable logic, circuitry, and/or code that may enable management of network devices, for example the network device 104, via a management connection, for example the management connection 106. For example, the management device 102 may be utilized by Information Technology (IT) operators to enable management of various devices in an IT network. The management device 102 may also comprise a dedicated entity, for example, the remote management agent 108, to enable performing management operations, which may comprise discovering and/or navigating management resources in a network, manipulating and/or administrating management resources, requesting and/or controlling subscribing and/or unsubscribing operations, and executing and/or specific management methods and/or procedures. The management device 102 may perform management operations, via the remote management agent 108 for example, wherein the management device 102 may communicate with devices in a network to ensure availability of remote systems, to validate that systems may be up-to-date, and/or to perform any security patch updates that may be necessary.

The processor 112 may comprise suitable logic, circuitry and/or code that may enable performing processing operations, for example management related operations, in the management device 102. The invention may not be limited to a specific processor, but may comprise for example, a general purpose processor, a specialized processor or any combination of suitable hardware, firmware, software and/or code, which may be enabled to provide two-level authorization in accordance with the various embodiments of the invention.

The memory 114 may comprise suitable logic, circuitry and/or code that may enable permanent and/or non-permanent storage and fetch of data and/or code used by the processor 112, for example during management related processing operations.

The remote management agent 108 may comprise suitable logic, circuitry, and/or code that may enable performing management operations based on one or more management standards. For example, the remote management agent 108 may enable performing control and/or management operations, based on Web Service Management (WS-Management) and/or Alert Standard Format (ASF) protocols, of existing and/or known nodes, which support similar protocols, in a network. The remote management agent 108 may comprise a logical and/or software entity that may be integrated within an OS running in the management device 102. The remote management agent 108 may also comprise a logical and/or software entity that may be integrated within a general network controller (NIC) which may be running in the management device 102. The remote management agent 108 may comprise a logical and/or software entity that may be integrated within a dedicated management sub-system within the management device 102, comprising, for example, the processor 112 and/or the memory 114.

The network device 104 may comprise suitable logic, circuitry, and/or code that may enable management by one or more management devices, for example the management device 102, via a management connection, for example the management connection 106. The network device 104 may be integrated into a network that may be managed by the management device 102. For example, the network device 104 may comprise a personal computer (PC), which may be operated in a network managed by the management device 102. The network device 104 may also comprise a dedicated entity, for example the management service 110, to enable participating in management operations.

The processor 116 may comprise suitable logic, circuitry and/or code that may enable performing processing operations, for example management related operations, in the network device 104. The invention may not be limited to a specific processor, but may comprise for example, a general purpose processor, a specialized processor or any combination of suitable hardware, firmware, software and/or code, which may be enabled to provide two-level authorization in accordance with the various embodiments of the invention.

The memory 118 may comprise suitable logic, circuitry and/or code that may enable permanent and/or non-permanent storage and fetch of data and/or code used by the processor 116, for example during management related processing operations.

The management service 110 may comprise suitable logic, circuitry, and/or code that may enable performing management operation based on one or more management standards. For example, the management service 110 may enable participating in control and/or management operations, based on WS-Management and/or ASF protocols. The management service 110 may comprise a logical and/or software entity that may be integrated within an OS running in the network device 104. The management service 110 may also comprise a logical and/or software entity that may be integrated within a general network controller (NIC) which may be running in the network device 104. Additionally, the management service 110 may comprise a logical and/or software entity that may be integrated within a dedicated management sub-system within the network device 104, comprising, for example, the processor 116 and/or the memory 118.

The management connection 106 may comprise interface and/or link that may enable interactions between devices in a managed network. For example, the management connection 106 may enable management communication between the management device 102 and network devices such as the network device 104. The management connection 106 may utilize one or more standards-based management protocols. For example, the management connection 106 may comprise use of one or more management protocols specified and/or published by standards entities such as the Distributed Management Task Force (DMTF). The management connection 106 may comprise utilizing DMTF-based Alert Standard Format (ASF) protocol messaging and/or WS-Management protocol messaging.

The Alert Standard Format (ASF) protocol may be utilized in first generation out-of-band management systems. The ASF protocol may comprise utilization of User Datagram Protocol (UDP) stack to enable communication between management devices and network devices. Devices comprising ASF functionality and/or interface may be ASF capable, wherein said devices may perform management operations via ASF messages. For example, in instances where the network device 104 may be ASF capable, the management device 102 may utilize ASF based messaging to perform management of the network device 104. More recently, WS-Management was proposed and developed as the next generation management protocol. The WS-Management is a specification based on Web Services, which typically utilize SOAP (XML based messaging) and HTTP(S) as a SOAP transport for communications. SOAP over HTTP(S) may require HTTP/TLS/TCP stack implementation, which may ensure improved security, reliability, and OS-independence.

The DASH, a DMTF management standard work group, has defined a Common Information Model (CIM) based instrumentation, analogous to object oriented representation of management data, of a managed subsystem that may be accessed using the WS-Management protocol. The CIM may provide common definition of management information for systems, networks, applications and services, and allows for vendor extensions. Devices that may comprise Intelligent Platform Management Interface (IPMI) and/or ASF internal interfaces and/or protocols may be may be managed externally via WS-Management messages. For example, in instances where the network device 104 may comprise IPMI and/or ASF based internal communications within the components of the network device 104, the management device 102 may utilize WS-Management based messaging to perform management of the network device 104 based on CIM-based mechanisms.

In operation, the network device 104 may be managed via the management device 102. For example, the management device 102 may utilize the management connection 106 to perform management operations in the network device 104. The management connection 106 may utilize one or more standards-based management protocols to enable performing management operations between the management device 102 and the network device 104. For example, the remote management agent 108 and/or the management service 110 may enable utilizing WS-management messaging, via the management connection 106, to enable management operations between the management device 102 and the network device 104.

DMTF/CIM may allow remote management, control, and/or access of subsystems, components, and/or devices within a managed system. For example, the network device 104 may comprise and/or constitute a WBEM/CIM server within the WBEM framework to enable remote interactions and/or access via WBEM/CIM clients, which may be run within management consoles, for example the management device 102. Additionally, CIM-based providers may be utilized within a managed system, for example the network device 104, to enable direct interactions and/or communications with specific components, subsystems, and/or devices within the network device 104.

Based on the general DMTF/CIM model, opaque management data models may provide a capability that may allow users to utilize opaque data objects to represent storage related information within a system. An Opaque Management Data (OPMD) profile may provide abstracted representations for storage related information within a system, wherein storage devices and/or regions within the system may be represented as storage elements, with minimal definitions of internal structure, format and/or details of the storage devices to enable abstraction of the internal variations and/or the inter-workings of the corresponding storage devices and/or regions. Consequently, entities within a DMTF/CIM based model may uniformly implement and/or interact with, to read from and/or write to for example, specific pieces of memory within the platform, represent via such opaque manage data objects; regardless of the variations in the corresponding storage elements. For example, the remote management agent 110 may utilize management messaging, based on DMTF/CIM models, carried via the management connection 106, to interact with the management services, to enable interactions with one or more storage elements within the network device 104, wherein said one or more storage elements may be represented via opaque management data objects.

Security mechanisms may be utilized to enable regulating and controlling management access via Opaque Management Data (OPMD) profiles in managed systems. This may, for example, ensure security during opaque management data based interactions, and/or guard against potential security risks and/or breaches posed when remote access and/or management is utilized. Such security mechanisms may comprise building into the Opaque Management Data (OPMD) profile dedicated user and/or owner based entities to perform and/or control access related operations. For example, the Opaque Management Data (OPMD) profile may comprise dedicated access-related component that may be utilized to authenticate access credentials and/or determine access permissions.

Alternatively, in an embodiment of the invention, the opaque management data models may utilize preexisting general access management profiles to perform and/or control storage access in a platform via the Opaque Management Data (OPMD) profile. For example, access to managed systems, for example the network device 104, via management devices, for example the management device 102, during management operations may be subject to 'security principal' controls within the DMTF/CIM management terminology. Security principals may exist on a managed system, for example the network device 104, and may be utilized to provide the security context under which the authenticated user and/or group may act within a managed system. The Role Based Authorization (RBA) and/or the Simple Identity Management (SIM) profiles may be utilized within DMTF/CIM based models to enable such security principal based management operations. The SIM profile and/or the RBA profile may be implemented within the management device 102, within CIM-based providers for instance, via the remote management agent 108, the processor 112, and/or the memory 114, for example. Similarly, the SIM profile and/or the RBA profile may be implemented in the network device 104, within CIM-based providers for instance, via the management service 110, the processor 116, and/or the memory 118, for example.

The Simple Identity Management (SIM) profile may provide the ability to manage and/or control accessibility to network devices in the form of local accounts. A SIM implementation, in the network device 104 for example, may enable authorization of account information and/or capabilities that a security principal may utilize while attempting to access the network device 104, via the management device 102 for example, in order to perform management operations. Consequently, the SIM implementation may provide one or more of available account-related opaque management services and/or operations.

The Role Based Authorization (RBA) Profile may provide the ability to authorize role properties of security principals accessing managed systems. Within the meaning of DMTF/CIM, a user of opaque management data objects may have one or more known and/or fixed roles that may comprise, for example, an administrator role, and operator role, and/or a read-only role. An RBA implementation, in the network device 104 for example, may enable authorization of role information and/or capabilities that a user may utilize while attempting to access and/or control opaque management data objects. Consequently, the RBA implementation may provide one or more of available role-related services and/or operations that may comprise creating, modifying, showing, and/or deletion of roles.

Figure 2A:
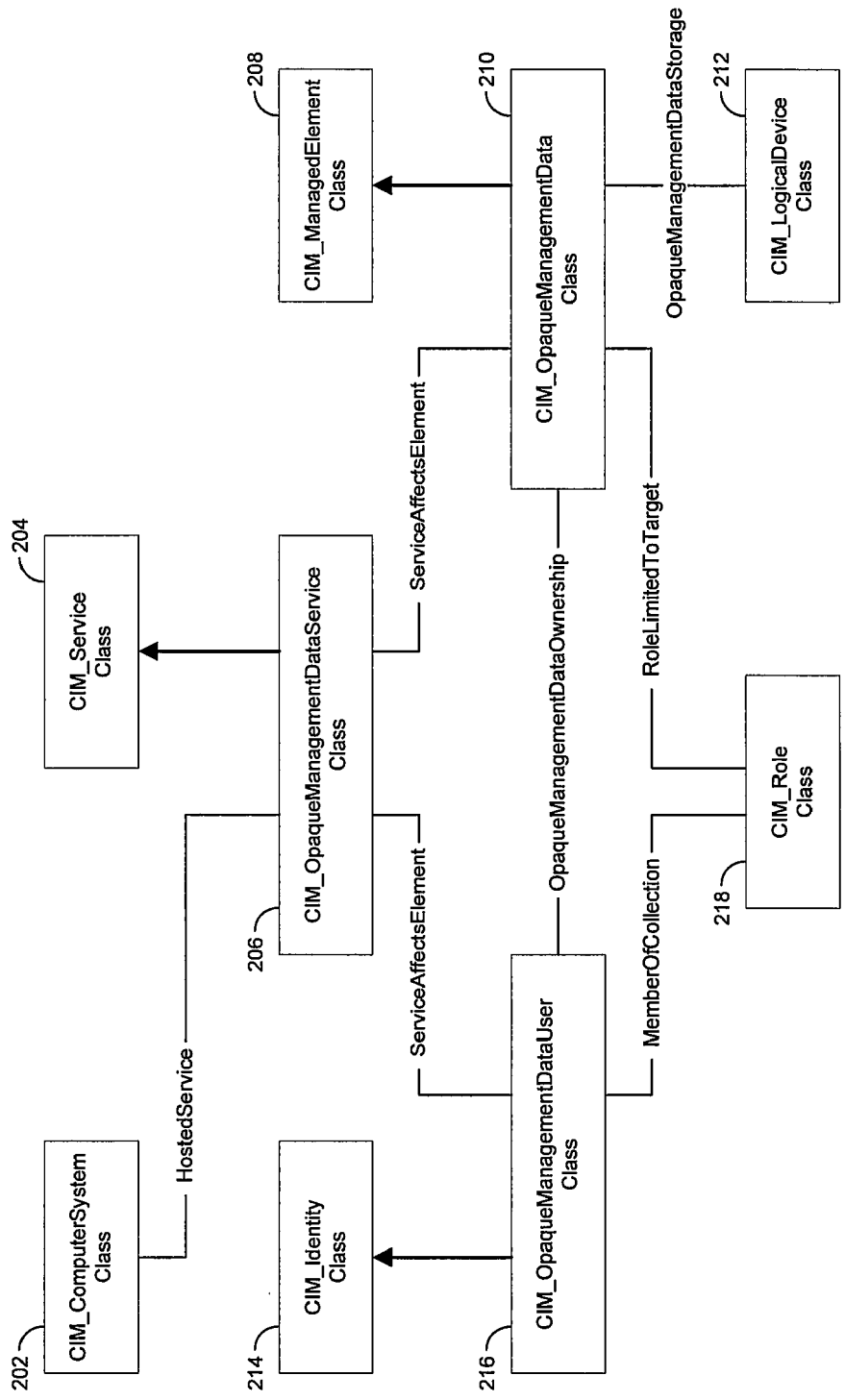
FIG. 2A is a block diagram that illustrates an implementation of Opaque Management Data (OPMD) class model profile, which may be utilized in connection with an embodiment of the invention.

FIG. 2A is a block diagram that illustrates an implementation of Opaque Management Data (OPMD) class model profile, which may be utilized in connection with an embodiment of the invention. Referring to FIG. 2A, there is shown a CIM_ComputerSystem class 202, a CIM_Service class 204, a CIM_OpaqueManagementDataService class 206, a CIM_ManagedElement class 208 a CIM_OpaqueManagementData class 210, a CIM_LogicalDevice class 212, a CIM_Identity class 214, a CIM_OpaqueManagementDataUser class 216, and a CIM_Role class 218.

The CIM_ComputerSystem class 202 may comprise functionality that may represent a managed system within a DMTF/CIM based profile. For example, an instance of the CIM_ComputerSystem class 202 may represent the network device 104 in an opaque management data profile.

The CIM_Service class 204 may comprise functionality that may generally represent services that may be available in DMTF/CIM profiles. The CIM_Service class 204 may operate as a template for other particularized services available in DMTF/CIM profiles, and may comprise core functionality and/or information that may be supplemented to enable representing such particularized services.

The CIM_OpaqueManagementDataService class 206 may be derived from the superclass CIM_Service 204, and may comprise additional functionality to provide service operations particular to Opaque Management Data (OPMD) profiles. For example, opaque management data based services available via a managed system represented by an instance of the CIM_ComputerSystem class 202 may be handled via an instance of the CIM_OpaqueManagementDataService class 206. The CIM_OpaqueManagementDataService class 206 may function as a central element within OPMD profile, and may serve as an interface to facilitate reception of opaque management data operation requests.

The CIM_ManagedElement class 208 may comprise functionality that may represent an element within a managed system, which may be managed via a DMTF/CIM profile. The CIM_ManagedElement class 208 may operate as a template for other particularized elements that may be managed via DMTF/CIM profiles. The CIM_ManagedElement class 208 may also comprise core functionality and/or information that may be supplemented to enable representing such particularized elements.

The CIM_OpaqueManagementData class 210 may be derived from the superclass CIM_ManagedElement 208, and may comprise additional functionality that may enable representing a storage element within a managed system in an Opaque Management Data (OPMD) profile. For example, the CIM_OpaqueManagementData class 210 may comprise information that may provide a representation of a piece of memory in a managed system represented by an instance of the CIM_ComputerSystem class 202.

The CIM_LogicalDevice class 212 may comprise functionality that may enable providing logical representation for devices in DMTF/CIM profiles. For example, the CIM_LogicalDevice class 212 may provide a logical representation corresponding to a physical storage entity in a managed system represented by an instance of the CIM_ComputerSystem class 202.

The CIM_Identity class 214 may comprise functionality that may enable representing entities that may utilize DMTF/CIM profiles. For example, instance of the CIM_Identity class 214 may be utilized to represent and/or identify owner, user, and/or owner/user within a DMTF/CIM profile in a managed system. The CIM_Identity class 214 may operate as a template for user related classes within DMTF/CIM profiles, and may comprise core functionality and/or information that may be supplemented to enable representing such particularized users within DMTF/CIM profiles.

The CIM_OpaqueManagementDataUser class 216 may be derived from the superclass CIM_Identity 214, and may comprise additional functionality that may enable representing opaque management data users within a managed system. For example, the CIM_OpaqueManagementDataUser class 216 may comprise information that may provide a representation of a particular user of opaque management data objects in a system represented by an instance of the CIM_ComputerSystem 202. The CIM_OpaqueManagementDataUser class 216 may also comprise functionality that may enable representing other opaque management data user specific information beyond simple authentication of access rights and/or privileges. The CIM_OpaqueManagementDataUser class 216 may comprise quota related properties, "AllocationQuota" and "AllocatedBytes" properties for example, that may track and/or validate quota information within the opaque management data profile.

The CIM_Role class 218 may comprise functionality that may enable representing access groups, which may comprise differing rights, within opaque management data profile. The CIM_Role 218 may enable providing rights and/or privilege-like properties when using the CIM_OpaqueManagementData class 210 and/or the CIM_OpaqueManagementDataUser class 216.

In operation, the Opaque Management Data (OPMD) profile may provide the capability to allow users to utilize opaque data objects to represent storage related information within a system. The Opaque Management Data (OPMD) profile may provide abstracted representations for one or more storage elements within a system, wherein minimal definition of the structure, format and/or details of the storage may be included. For example, in a managed system represented via an instance of the CIM_ComputerSystem class 202, opaque management data profile support, via one or more instance of the CIM_OpaqueManagementService class 206, through "HostedService" association. The CIM_OpaqueManagementService class 206 may enable interfacing with, and overall control of the opaque management data profile.

Within the opaque management data profile, various storage elements that may correspond to one or more instances of the CIM_LogicalDevice class 212, may be represented and/or managed via instances of the CIM_OpaqueManagementData class 210 for example. Each of the instances of the CIM_OpaqueManagementData class 210 may model the storage elements, corresponding to the CIM_LogicalDevice class 212 instances, via "OpaqueManagementDataStorage" associations for example. The CIM_OpaqueManagementData class 210 instances may enable abstracting the storage elements, wherein minimal information regarding internal structure, format and/or other details of the storage devices, which may be ascertained via the CIM_LogicalDevice class 212 for example; may be included to enable uniform accessibility by prospective users. Opaque management data related operations requested via the CIM_OpaqueManagementService class 206 may be performed through instances of the CIM_OpaqueManagementData class 210 representing storage elements; via "ServiceAffectElement" associations for example.

Access related operations within the opaque management data profile may be provided via the CIM_OpaqueManagementDataUser class 216. The CIM_OpaqueManagementDataUser class 216 may enable maintenance of quota-related information comprising, the "AllocationQuota" and "AllocatedBytes" properties. Use of the CIM_OpaqueManagementDataUser class 216 may also enable modeling of user related information, wherein opaque management data related access operations requested via the CIM_OpaqueManagementService class 206 may be performed through the CIM_OpaqueManagementData class 210, via "ServiceAffectElement" associations, for example. Additionally, the CIM_OpaqueManagementDataUser class 216 may enable modeling of owner and/or user related operations during opaque management data operations performed via the CIM_OpaqueManagementData class 210, through "CIM_OpaqueManagementDataOwnership" associations. Owner and/or user related authentication operations may be performed within the CIM_Role class 218, by the CIM_OpaqueManagementData class 210 and/or the CIM_OpaqueManagementDataUser class 216, via the "MemberOfCollection" and/or "RoleLimitedToTarget" associations, respectively, for example. In this regard, the use of the CIM_Role class 218 may be different from other uses, for example, in the context of RBA/SIM profiles.

While use of the CIM_OpaqueManagementDataUser class 216 in user-related operations may be beneficial, especially for including such information as the quota properties, it may have many shortcomings. For example, using dedicated access and/or user related components within the opaque management data profile may be redundant since other access related components may already exist, via the RBA/SIM profile for example, causing redundant code and storage requirement. Additionally, use of the CIM_OpaqueManagementDataUser class 216 may cause scalability issues since it requires an instance of the CIM_OpaqueManagementDataUser class 216 for every instance of the CIM_OpaqueManagementData class 210, additionally, it requires the same number of instances the CIM_Role class 218 as the number of instances of the CIM_OpaqueManagementData class 210. Due to the direct ownership association between the two classes, deleting an instance of CIM_OpaqueManagementData class 210 may cause deletion of the associated CIM_OpaqueManagementDataUser class 216; therefore, users related access information would be deleted, only to potentially be recreated subsequently. Furthermore, CIM_OpaqueManagemenTDataUser would result in a new proposed subclass derived from the CIM_Identity class 214 although the properties AllocationQuota and/or AllocatedBytes do not seem to fit well with the general description of the CIM_Identity class 214. Accordingly, it may be desirable to have access related functionality that may reuse and/or build on existing access functionality, and which may be independent from direct ownership association with data instances.

Figure 2B:
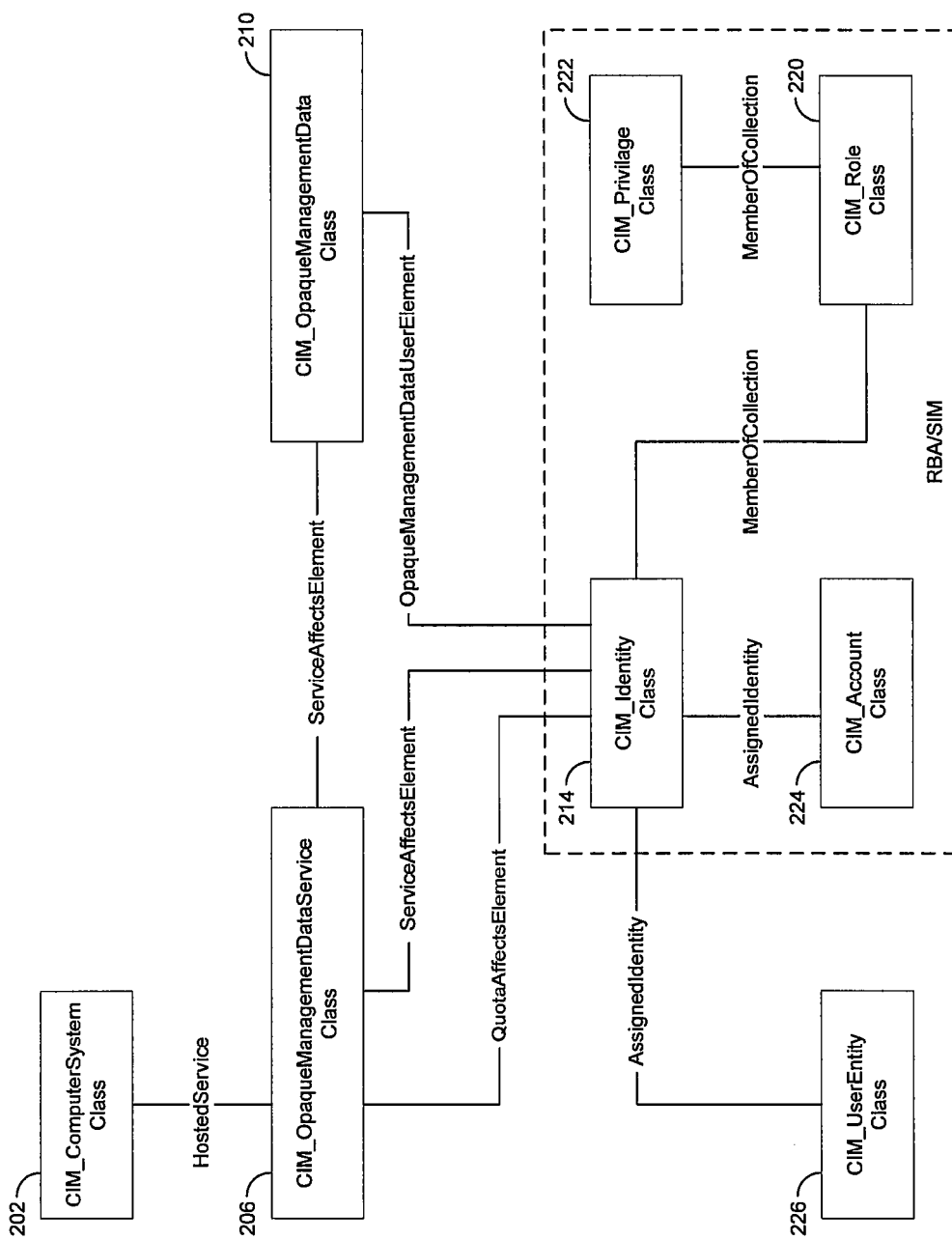
FIG. 2B is a block diagram that illustrates an exemplary implementation of Opaque Management Data (OPMD) class model profile utilizing Role Based Authorization/Simple Identity Management (RBA/SIM) profiles, in accordance with an embodiment of the invention.

FIG. 2B is a block diagram that illustrates an exemplary implementation of Opaque Management Data (OPMD) class model profile utilizing Role Based Authorization/Simple Identity Management (RBA/SIM) profiles, in accordance with an embodiment of the invention. Referring to FIG. 2B, there is shown the CIM_OpaqueManagementDataService class 206, the CIM_ComputerSystem class 202, the CIM_OpaqueManagementData class 210, the CIM_Identity class 214, a CIM_Role class 220, a CIM_Privilege class 222, a CIM_Account class 224, and a CIM_UserEntity class 226.

The CIM_OpaqueManagementDataService class 206, the CIM_OpaqueManagementData class 210, and the CIM_ComputerSystem class 202 may be substantially as described with respect to FIG. 2A. However, the CIM_OpaqueManagementDataService class 206 and/or the CIM_OpaqueManagementData class 210 may be altered to enable utilizing RBA/SIM profile based mechanism to implement access related operations.

The CIM_Identity class 214 may be substantially as described with respect to FIG. 2A. However, the CIM_Identity class 214, the CIM_Role class 220, the CIM_Privilege class 222, and the CIM_Account class 224 may be utilized to perform access related operations based on the Role Based Authorization/Simple Identity Management (RBA/SIM) profiles.

The CIM_Role class 220 may comprise functionality that may represent roles that may be available within RBA/SIM profiles. For example, authorized roles, including, for example administrator, operator, and/or read-only roles, in a managed system may be represented through instances of the CIM_Role class 220. The CIM_Privilege class 222 may comprise functionality that may enable representing one or more rights and/or privileges that may typically be associated with a role. The rights and/or privileges that may be granted to an opaque managed data profile user and/or owner may be represented via instances of the CIM_Privilege class 222 that may associated with the instance of the CIM_Role class 220. The CIM_Account class 224 may comprise functionality that may represent accounts defined within a DMTF/CIM profile in a managed system. For example, an instance of the CIM_Account class 224 may represent an account that may be utilized during opaque management data access and/or utilizations within the network device 104.

The CIM_UserEntity class 226 may comprise functionality that may represent applicant users within a DMTF/CIM profile in a managed system. For example, an instance of the CIM_UserEntity class 226 may represent an applicant user that may be represented via the CIM_Identity class 214.

In operation, the opaque management data profile may generally function substantially similar to the profile described in FIG. 2A. However, access and/or user related operations may be utilized via RBA/SIM based mechanisms. Because of the lack of direct ownership association for the data and/or user related components, the access functionality need not match the same number of existing data instance, and common users may be represented jointly. Accordingly, one or more instance CIM_Identity class 214 may be utilized as the main access controlling components in the profile, wherein instances of the CIM_Identity class 214 may represent an owner and/or, a user of the opaque management data profile. Instances of the CIM_Role class 220 may be utilized to identify applicable roles, via "MemberOfCollection," within each of the instance of the CIM_Identity class 214. The privileges of each of the instances of the CIM_Identity class 214 may be determined by instances of the CIM_Privilege class 222, via "MemberOfCollection" to intermediate instances of the CIM_Role class 220. Users that may share common roles and privileges may be represented by instances of the CIM_Account class 224, which may be associated via "AssignedIdentity" associations to a single instance of the CIM_Identity class 214, with instances of the CIM_Role class 220 and the CIM_Privilege class 222, respectively, defining these common roles and privileges. Applications, rather than users, may also be enabled to share common roles and privileges in similar manners, wherein said application may be represented by instances of the CIM_UserEntity class 226, which may be associated via "Assignedidentity" associations to a single instance of the CIM_Identity class 214.

Opaque management data related access operations requested via the CIM_OpaqueManagementService class 206 may be performed through instances of the CIM_OpaqueManagementData class 210 and the CIM_Identity class 214, via "ServiceAffectElement" associations. For opaque management data operations pertaining to each of the CIM_OpaqueManagementData class 210 instances, "OpaqueManagementDataUserElement" associations with instances of the CIM_Identity class 214 may enable performing explicit modeling of owner and/or user access determinations. The "OpaqueManagementDataUserElement" may comprise, for example, "IsOwner" and/or "AccessRights" properties to determine ownership status, for example False/True, and/or access rights, which may include read-only and/or read-write. Quota related operations may be performed, for example, via "QuotaAffectsElement" associations between instances of the CIM_Identity class 214 and instances of the CIM_OpaqueManagementDataService class 206. The "QuotaAffectsElement" association may define quota information for owners and/or users modeled via the instances of the CIM_Identity class 214. For example, the "QuotaAffectsElement" association may comprise the "AllocationQuota" and "AllocatedBytes" properties which are defined directly within instances of the CIM_OpaqueManagementDataUser class 216. This may enable tracking and/or validating of user-specific quota information within the opaque management data profile, substantially as described, for example, with respect to FIG. 2A.

Figure 2C:
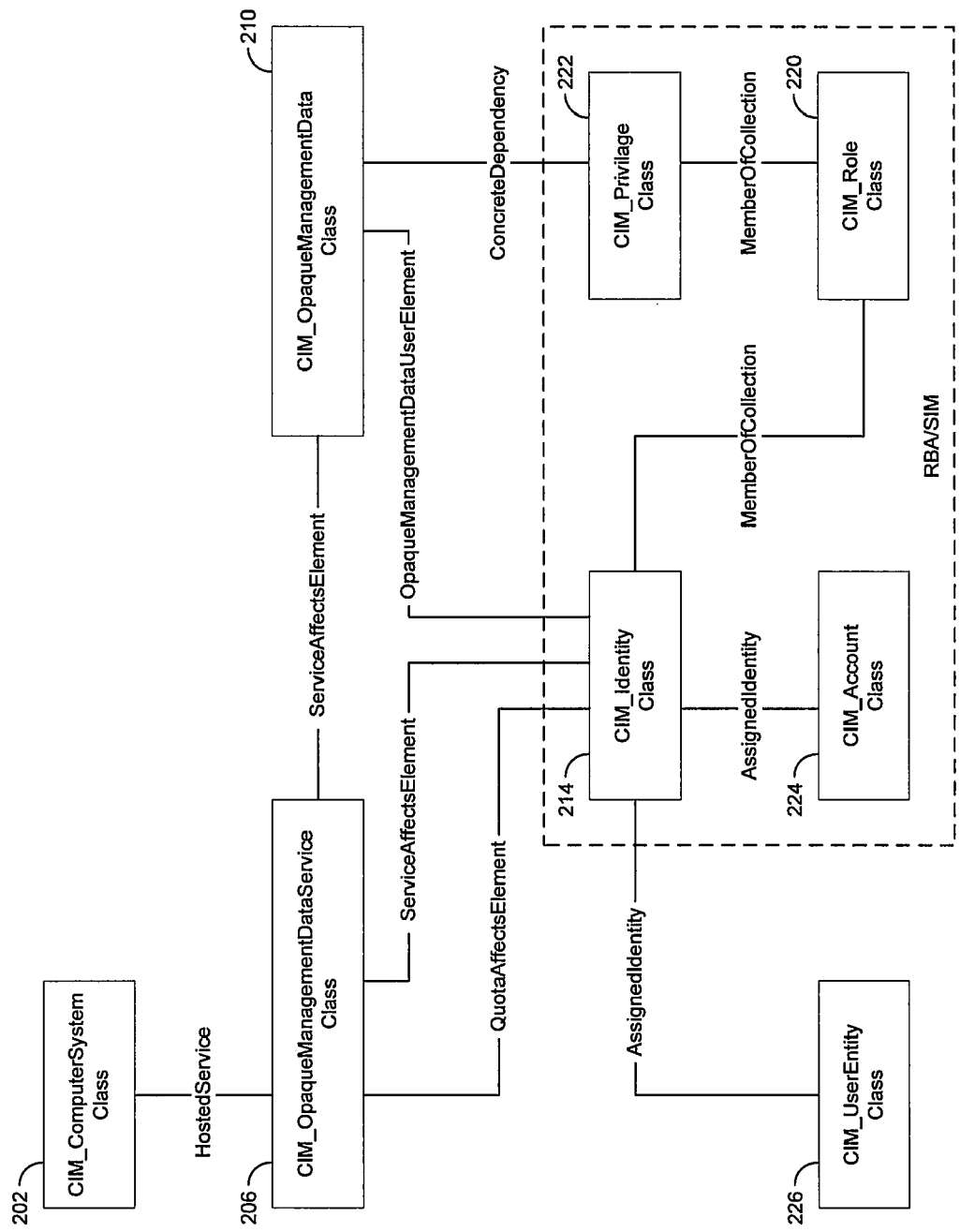
FIG. 2C is a block diagram that illustrates an alternate exemplary implementation of Opaque Management Data (OPMD) class model profile utilizing Role Based Authorization/Simple Identity Management (RBA/SIM) profiles, in accordance with an embodiment of the invention.

FIG. 2C is a block diagram that illustrates an alternate exemplary implementation of Opaque Management Data (OPMD) class model profile utilizing Role Based Authorization/Simple Identity Management (RBA/SIM) profiles, in accordance with an embodiment of the invention. Referring to FIG. 2C, shown the CIM_OpaqueManagementDataService class 206, the CIM_ComputerSystem class 202, the CIM_OpaqueManagementData class 210, the CIM_Identity class 214, the CIM_Role class 220, the CIM_Privilege class 222, the CIM_Account class 224, and the CIM_UserEntity class 226.

The CIM_OpaqueManagementDataService class 206, the CIM_OpaqueManagementData class 210, the CIM_ComputerSystem class 202, the CIM_Identity class 214, the CIM_Role class 220, the CIM_Privilege class 222, the CIM_Account class 224, and the CIM_UserEntity class 226 may be comprised substantially as described in FIG. 2B. However, the "ConcreteDependency" association may be utilized to access specific privileges defined for the CIM_OpaqueManagementData class 210. Consequently, the "OpaqueManagementDataUserElement" association may not comprise access right related properties and/or information, and may be utilized, for example, to enable ownership related authentication operations between instances of the CIM_OpaqueManagementData class 210 and instances of the CIM_Identity class 214.

Figure 3:
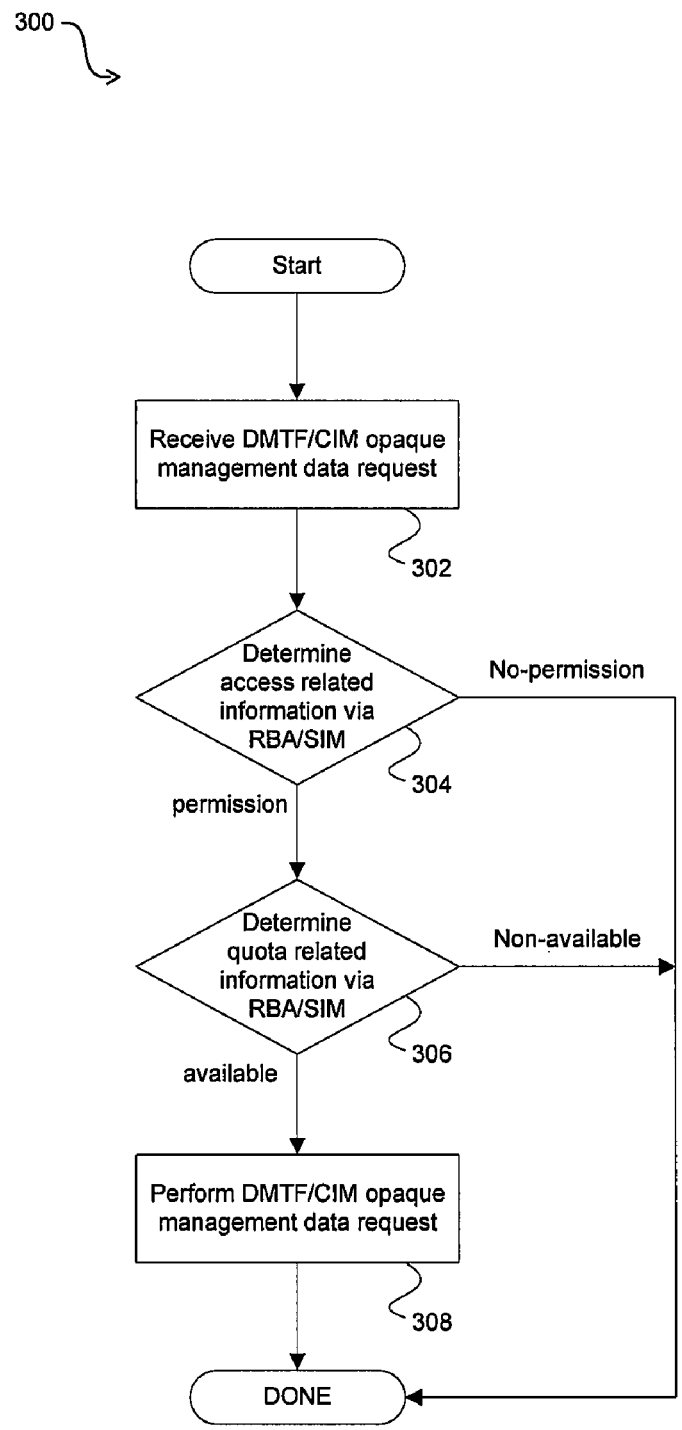
FIG. 3 is a flow chart that illustrates Opaque Management Data (OPMD) class model profile utilizing Role Based Authorization/Simple Identity Management class profiles, in accordance with an embodiment of the invention.

FIG. 3 is a flow chart that illustrates Opaque Management Data (OPMD) class model profile utilizing Role Based Authorization/Simple Identity Management class profiles, in accordance with an embodiment of the invention. Referring to FIG. 3, there is shown a flow chart 300 comprising a plurality of exemplary steps, which may enable utilizing RBA/SIM class profiles during opaque management data operations in a managed system, for example the network device 104.

In step 302, a DMTF/CIM based opaque management data related request may be received in a managed system. For example, a request to perform storage related operations in an opaque management data profile may be sent to the network device 104, via the management device 102 and the management connection 106. In step 304, a determination of access related information pertaining to the requested opaque management data operation may be performed. For example, the requested operation may be passed, within a DMTF/CIM based opaque management data profile, from an instance of the CIM_ComputerSystem 202, based on "HostedService" association, to an instance of the CIM_OpaqueManagementDataService class 206, which may function as an interface to one or more instances of the CIM_OpaqueManagementData class 210, representing storage elements in the managed system. In an embodiment of the invention, RBA/SIM profile based functionality may be utilized to perform necessary access authentication operations. For example, instances of the CIM_Identity class 214 may be utilized, by instances of the CIM_OpaqueManagementDataService class 206 and the CIM_OpaqueManagementData class 210, through the "ServiceAffectsElement" and "OpaqueManagementDataUserElement" associations, respectively, to initiate access related authentication. Within the RBA/SIM functionality, the CIM_Role class 220, the CIM_Privilege class 222, the CIM_Account class 224, and/or the CIM_UserEntity class 226 may be utilized to effectuate access authentication, substantially as described, for example, with respect to FIGS. 2B, and 2C. In instances where it may be determined that access may not be permissible, the exemplary steps may terminate.

Returning to step 304, in instances where it may be determined that access may be permitted, the exemplary steps may proceed to step 306. In step 306, a determination of quota related availability information pertaining to the requested opaque management data operation may be performed. Quota related operations may be performed in conjunction with sub-elements utilized to perform RBA/SIM profile based functionality may be utilized to perform access authentication operations. For example, instances of the CIM_Identity class 214 may be utilized, by instances of the CIM_OpaqueManagementDataService class 206, through the "QuotaAffectsElement" associations, to effectuate quota related operations. The "AllocationQuota" and "AllocatedBytes" properties of the "QuotaAffectsElement" association may be used, for example, to track and/or validate quota related information pertaining to a received opaque management data related request, substantially as described in FIGS. 2B, and 2C. In instances where it may be determined that quota related information and/or requirement may not be available, the exemplary steps may terminate.

Returning to step 306, in instances where it may be determined that quota related information and/or requirement may be available, the exemplary steps may proceed to step 308. In step 308, the requested opaque management data operation may be performed in the managed system. For example, once access and quota validations have been performed successfully, the requested opaque management data operation may be performed via instances of the CIM_OpaqueManagementData class 210.

Various embodiments of the invention may comprise a method and system for modeling options for opaque management data for a user and/or an owner. Opaque management data operations may be performed in the network device 104. The network device 104 may be managed by the management device 102 and the management connection 106 via Distributed Management Task Force (DMTF) management profiles, based on the Common Information Model (CIM) protocol. Access authentication operations may be performed during opaque management data operations based on DMTF/CIM Role Based Authorization (RBA) and/or Simple Identity Management (SIM) profiles. One or more instances of the CIM_Identity class 214 may be utilized to enable authentication of ownership and/or access rights, via instances of the CIM_Role class 220 and/or instances of the CIM_Privilege class 222. Consequently, a plurality of common users, which may be represented via instances of the CIM_Identity class 214, and/or a plurality of common applications, which may be represented via instances of the CIM_UserEntity class 226, represent authenticated instances of common users or common applications. Quota related operations may be performed via "QuotaAffectsElement" associations between instances of the CIM_Identity class 214 and instances of the CIM_OpaqueManagementDataService class 206. The "QuotaAffectsElement" association may comprise the "AllocationQuota" and/or "AllocatedBytes" properties to enable tracking and/or validating of quota related information within the opaque management data profile.

Another embodiment of the invention may provide a machine or computer readable storage or medium, having stored thereon, a computer program having at least one code section executable by a machine or a computer, thereby causing the machine or computer to perform the steps as described herein for modeling options for opaque management data for a user and/or an owner.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for network management, the method comprising:
   in a network device managed via Distributed Management Task Force (DMTF) protocols:
   receiving a request during opaque management data operations, wherein said request is handled in said network device using one or more instances of Common Information Model (CIM) based CIM_OpaqueManagementData class representing one or more corresponding storage components in said network device; and
   authenticating operations performed during said handling of said request using Common Information Model (CIM) data model access profiles by utilizing one or more instances of at least one of CIM_Role and CIM_Privilege, via one or more instances of CIM_Identity class.

2. The method according to claim 1, comprising validating access related information via said Common Information Model (CIM) data model access profiles during said opaque management data operations, wherein said access related information comprise one or more of ownership, access rights, and quota information.

3. The method according to claim 2, wherein said CIM data model access profiles comprise one or more of Role Based Authorization (RBA) and Simple Identity Management (SIM) based profiles.

4. The method according to claim 3, comprising utilizing said one or more instances of said CIM_Identity class while utilizing RBA/SIM based profiles to perform said validation of said access related information.

5. The method according to claim 4, comprising utilizing a plurality of CIM_Account class to represent a plurality of common users sharing a common instance of said CIM_Identity class.

6. The method according to claim 4, comprising utilizing a plurality of instances of CIM_UserEntity class to represent a plurality of common applications sharing a common instance of said CIM_Identity class.

7. The method according to claim 4, comprising associating said one or more instances of CIM_OpaqueManagementData class with corresponding instances of said CIM_Identity class via OpaqueManagementDataUserElement associations to enable performing said validation of said access related information.

8. The method according to claim 7, wherein each of said OpaqueManagementDataUserElement associations comprises at least one of ownership, access right properties, and information to enable performing said validation of said access permission related information.

9. The method according to claim 4, comprising associating instances of a CIM_OpaqueManagementDataService class with corresponding instances of said CIM_Identity class via QuotaAffectsElement associations to enable performing quota related operations.

10. The method according to claim 9, wherein each of said QuotaAffectsElement associations comprises one or more of quota related properties and information to enable performing said quota related operations.

11. The method according to claim 10, wherein said quota related properties comprise one or more of "AllocationQuota" and "AllocatedBytes" properties.

12. A system for network management, the system comprising:
   one or more processors in a network device that is managed via Distributed Management Task Force (DMTF) protocol, said one or more processors being operable to:
   receive a request during opaque management data operations, wherein said request is handled in said network device using one or more instances of Common Information Model (CIM) based CIM_OpaqueManagementData class representing one or more corresponding storage components in said network device; and
   authenticate operations performed during said handling of said request using Common Information Model (CIM) data model access profile by utilizing one or more instances of at least one of CIM_Role and CIM_Privilege, via one or more instances of CIM_Identity class.

13. The method according to claim 12, wherein said one or more processors enable validation of access related information via said Common Information Model (CIM) data model access profiles during said opaque management data operations, wherein said access related information comprise one or more of ownership, access rights, and quota information.

14. The system according to claim 13, wherein said CIM data model access profiles comprise one or more of Role Based Authorization (RBA) and Simple Identity Management (SIM) based profiles.

15. The system according to claim 14, wherein said one or more processors enable utilization of said one or more instances of said CIM_Identity class while utilizing RBA/SIM based profiles to perform said validation of access related information.

16. The system according to claim 15, wherein said one or more processors enable utilization of a plurality of CIM_Account class to represent a plurality of common users sharing a common instance of said CIM_Identity class.

17. The system according to claim 15, wherein said one or more processors enable utilization of a plurality of instances of CIM_UserEntity class to represent a plurality of common applications sharing a common instance of said CIM_Identity class.

18. The system according to claim 15, wherein said one or more processors enable association of said one or more instances of CIM_OpaqueManagementData class with corresponding instances of said CIM_Identity class via OpaqueManagementDataUserElement associations to enable performing said validation of said access related information.

19. The system according to claim 18, wherein each of said OpaqueManagementDataUserElement associations comprises at least one of ownership, access right properties, and information to enable performing said validation of said access related information.

20. The system according to claim 15, wherein said one or more processors enable association of instances of a CIM_OpaqueManagementDataService class with corresponding instances of said CIM_Identity class via QuotaAffectsElement associations to enable performing quota related operations.

21. The system according to claim 20, wherein each of said QuotaAffectsElement associations comprises one or more of quota related properties and information to enable performing said quota related operations.

22. The system according to claim 21, wherein said quota related properties comprise one or more of "AllocationQuota" and "AllocatedBytes" properties.

23. A non-transitory computer readable medium having stored thereon, a computer program having at least one code section for network management, the at least one code section being executable by a computer, managed via Distributed Management Task Force (DMTF) protocols, for causing the computer to perform steps comprising:
    receiving a request during opaque management data operations, wherein said request is handled in the computer using one or more instances of Common Information Model (CIM) based CIM_OpaqueManagementData class representing one or more corresponding storage components in the computer; and
    authenticating operations performed during said handling of said request using Common Information Model (CIM) data model access profiles by utilizing one or more instances of at least one of CIM_Role and CIM_Privilege, via one or more instances of CIM_Identity class.

24. The non-transitory computer readable medium according to claim 23, comprising validating access related information via said Common Information Model (CIM) data model access profiles during said opaque management data operations, wherein said access related information comprise one or more of ownership, access rights, and quota information.

25. The non-transitory computer readable medium according to claim 24, wherein said CIM data model access profiles comprise one or more of Role Based Authorization (RBA) and Simple Identity Management (SIM) based profiles.

26. The non-transitory computer readable medium according to claim 25, comprising utilizing said one or more instances of said CIM_Identity class while utilizing RBA/SIM based profiles to perform said validation of said access related information.

27. The non-transitory computer readable medium according to claim 26, comprising utilizing a plurality of CIM_Account class to represent a plurality of common users sharing a common instance of said CIM_Identity class.

28. The non-transitory computer readable medium according to claim 26, comprising utilizing a plurality of instances of CIM_UserEntity class to represent a plurality of common applications sharing a common instance of said CIM_Identity class.

29. The non-transitory computer readable medium according to claim 26, comprising associating said one or more instances of CIM_OpaqueManagementData class with corresponding instances of said CIM_Identity class via OpaqueManagementDataUserElement associations to enable performing said validation of said access related information.

30. The non-transitory computer readable medium according to claim 29, wherein each of said OpaqueManagementDataUserElement associations comprises at least one of ownership, access right properties, and information to enable performing said validation of said access permission related information.

31. The non-transitory computer readable medium according to claim 26, comprising associating instances of a CIM_OpaqueManagementDataService class with corresponding instances of said CIM_Identity class via QuotaAffectsElement associations to enable performing quota related operations.

32. The non-transitory computer readable medium according to claim 31, wherein each of said QuotaAffectsElement associations comprises one or more of quota related properties and information to enable performing said quota related operations.

33. The non-transitory computer readable medium according to claim 32, wherein said quota related properties comprise one or more of "AllocationQuota" and "AllocatedBytes" properties.

* * * * *